(12) United States Patent
HoeSup

(10) Patent No.: US 7,545,356 B2
(45) Date of Patent: Jun. 9, 2009

(54) LIQUID CRYSTAL DISPLAY DEVICE AND METHOD OF MANUFACTURING THE SAME

(75) Inventor: Soh HoeSup, Seongnam-si (KR)

(73) Assignee: LG. Display Co., Ltd., Seoul (KR)

( * ) Notice: Subject to any disclaimer, the term of this patent is extended or adjusted under 35 U.S.C. 154(b) by 734 days.

(21) Appl. No.: 11/320,048

(22) Filed: Dec. 28, 2005

(65) Prior Publication Data

US 2006/0290863 A1    Dec. 28, 2006

(30) Foreign Application Priority Data

Jun. 24, 2005    (KR) .................. 10-2005-0054917

(51) Int. Cl.
*G09G 3/36*    (2006.01)
(52) U.S. Cl. .......................... 345/94; 345/87
(58) Field of Classification Search .......... 345/50, 345/87, 90, 92, 94; 445/24; 349/140–146
See application file for complete search history.

(56) References Cited

U.S. PATENT DOCUMENTS

| | | | | |
|---|---|---|---|---|
| 5,959,763 A * | 9/1999 | Bozler et al. | ............... | 359/290 |
| 6,037,712 A * | 3/2000 | Codama et al. | ............. | 313/498 |
| 2004/0169627 A1* | 9/2004 | Hong | ........................ | 345/89 |
| 2004/0233182 A1* | 11/2004 | Chuang et al. | .............. | 345/204 |
| 2006/0020469 A1* | 1/2006 | Rast | .......................... | 704/270 |
| 2006/0202036 A1* | 9/2006 | Wang et al. | ........... | 235/462.07 |

* cited by examiner

*Primary Examiner*—Ricardo L Osorio
(74) *Attorney, Agent, or Firm*—Brinks Hofer Gilson & Lione

(57) ABSTRACT

An LCD includes a first gate line and a second gate line disposed parallel to each other and perpendicular to a first data line and a second data line, thereby defining a unit pixel region, a first common line disposed parallel to the gate lines, a second common line extending from the first common line, a pixel bar and pixel electrodes disposed in the unit pixel region and electrically connected to a first TFT, a second TFT electrically connected to the second common line, a common bar and common electrodes electrically connected to the second TFT, the common electrodes being disposed alternately with the pixel electrodes.

52 Claims, 12 Drawing Sheets

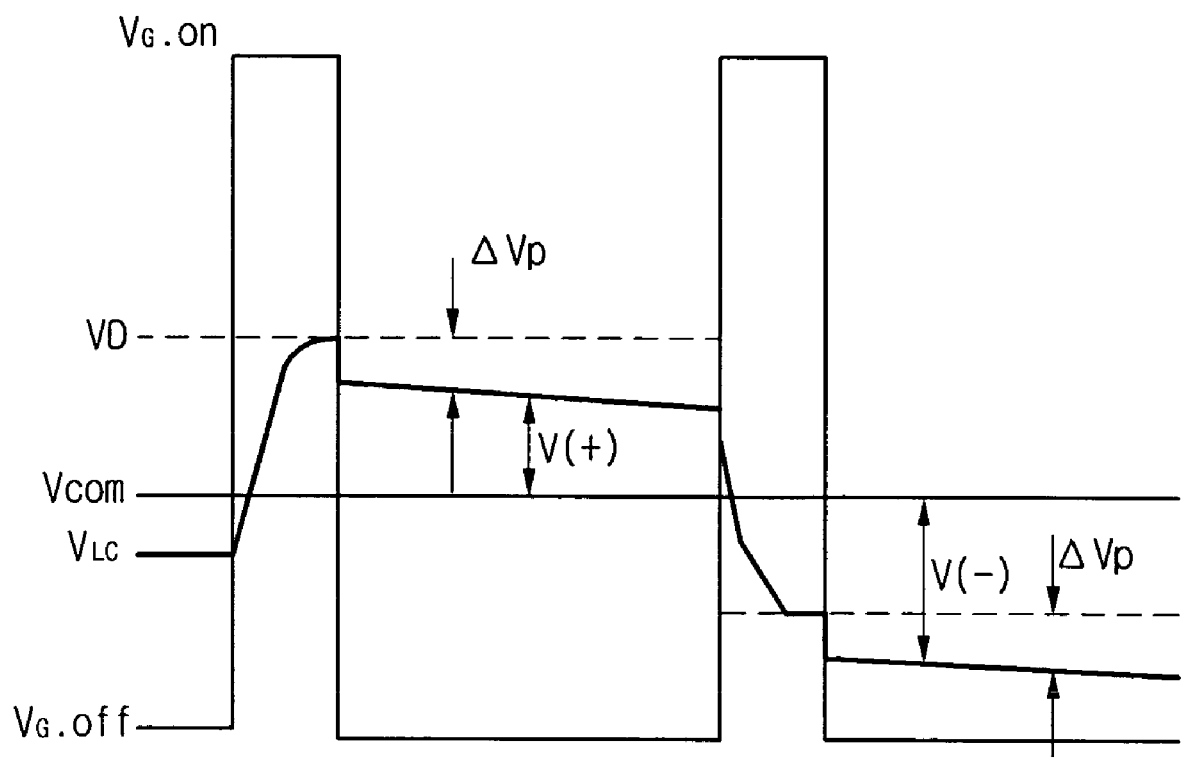

LIQUID CRYSTAL DISPLAY DEVICE AND METHOD OF MANUFACTURING THE SAME

TECHNICAL FIELD

The present application relates to a liquid crystal display device, and more particularly, to a liquid crystal display device capable of enhancing image quality by compensating a level shift voltage generated at a pixel region, and a method of manufacturing the same.

BACKGROUND

In today's information-driven society, the importance of liquid crystal display device (LCD) technology is increasing. Cathode ray tube (CRT) devices have been widely used to date and have many advantages in terms of performance and price. However, CRTs also have disadvantages in terms of miniaturization and portability.

In order to replace the CRT, a lightweight and slim LCD that can provide high brightness, large-size, low power consumption, and low cost has been developed.

A widely-used twist nematic (TN) LCD includes a common electrode and a pixel electrode that are formed on a top substrate and a bottom substrate, respectively. An electric field is generated between the common electrode and the pixel electrode. Due to the electric field, liquid crystals injected between the top substrate and the bottom substrate are twisted and a predetermined image is displayed. The TN LCD, however, has a very narrow viewing angle.

To solve the narrow viewing angle problem, several kinds of new LCDs have been developed. Examples include an in-plane switching (IPS) LCD and an optically compensated birefringence (OCB) LCD.

In an IPS LCD, two electrodes are formed on a single substrate (bottom substrate) so as to drive liquid crystal molecules while maintaining them in a horizontal direction with respect to the substrate. By applying a predetermined voltage to the two electrodes, an electric field may be generated in a horizontal direction with respect to the substrate.

Accordingly, in such an IPS LCD, the major axis of the liquid crystal molecule is not aligned in a vertical direction with respect to the substrate. For this reason, compared with the TN LCD, the IPS LCD has an excellent viewing angle characteristic because the change in the birefringence of the liquid crystal with respect to a clockwise direction is small.

Hereinafter, a pixel structure of a related art IPS LCD will be described with reference to FIGS. 1, 2, 3A and 3B.

FIG. 1 is a plan view of a pixel structure in a related art IPS LCD.

Referring to FIG. 1, gate lines 1a and 1b for applying driving signals are positioned parallel to each other and perpendicular to data lines 5a and 5b for applying data signals, thereby defining a unit pixel region. A thin film transistor (TFT) T1 acting as a switching element is positioned near the intersection of the gate line 1a and the data line 5a.

A common line 3 is positioned parallel to gate lines 1a and 1b. A plurality of common electrodes 3a extend from the common line 3 in a direction parallel to the data lines.

In the unit pixel region adjacent to the gate line 1a, a drain electrode of the TFT is extended and positioned in parallel to the gate line 1a.

Also, in the unit pixel region, a pixel electrode 7 is arranged between the common electrodes 3a in a slit shape. The pixel electrode 7 electrically contacts with the drain electrode disposed in parallel to the gate line 1a.

That is, the common electrodes 3a and the pixel electrode 7 are alternately arranged spaced apart from each other by a predetermined distance.

Also, the slit-shaped pixel electrode 7 is extended to a portion of the common line 3, thereby forming a storage capacitance between the common line 3 and the pixel electrode 7.

In such an IPS LCD, a horizontal electric field is formed between the pixel electrode 7 and the common electrodes 3a, and liquid crystal molecules are aligned according to the horizontal electric field. Accordingly, compared with the TN LCD, the IPS LCD has an improved viewing angle characteristic.

FIG. 2 is an equivalent circuit diagram of the pixel region illustrated in FIG. 1.

Referring to FIG. 2, in the unit pixel, one switching element TFT is formed near the intersection of gate lines VG(n) and VG(n-1) and data lines. A storage capacitance $C_{stg}$ and a liquid crystal capacitance CLC are connected to the TFT in parallel.

The storage capacitance $C_{stg}$ is formed between the pixel electrode and the common electrode, and the liquid crystal capacitance CLC is a static capacitance applied to a liquid crystal layer. Also, a parasitic capacitance $C_{gs}$ is formed between a gate electrode and a drain electrode of the TFT.

In the above-described LCD, when the TFT is turned on, a pixel voltage from the data line is applied to the pixel electrode. On the contrary, when the TFT is turned off, the pixel voltage is constantly maintained due to the static capacitances CLC and $C_{stg}$ until a next pixel region is turned on.

However, when the TFT changes from the turned-on state to the turned-off state, a level shift voltage $\Delta V_P$ is generated, thereby decreasing the pixel voltage. The level shift voltage $\Delta V_P$ generated when a white voltage is applied to the pixel region is different from the level shift voltage $\Delta V_P$ generated when a black voltage is applied to the pixel region. This relationship is expressed as $$\nabla V_G = (V_{G,ON} - V_{G,OFF}) \times \frac{C_{GS}}{(C_{LC} + C_{STG} + C_{GS})}$$

In the above equation, $C_{LC}$ is not a constant, but a static capacitance that changes depending on the voltage applied to the liquid crystal layer. Also, $C_{LC}$ changes depending on the characteristics of the liquid crystal, pixel design value, and process deviation. That is, when a sufficient voltage is applied to the liquid crystal layer (white state), $C_{LC}$ is maximized so that the level shift voltage $\Delta V_P$ is minimized.

When a voltage applied to the liquid crystal layer is minimized (black state), $C_{LC}$ is minimized so that the level shift voltage $\Delta V_P$ is maximized.

FIGS. 3A and 3B are graphs for explaining the problem of degrading image quality due to the level shift voltage generated at the pixel region. Specifically, FIG. 3A illustrates a case in which the pixel is turned on when the white voltage is applied thereto, and FIG. 3B illustrates a case in which the pixel is turned off when the black voltage is applied thereto.

Referring to FIG. 3A, when a select signal (a white state voltage) VD applied to the pixel changes from a high state to a low state, a voltage drop is generated in the high region due to the level shift voltage $\Delta V_P$, so that a pixel voltage V(+) lower than an original voltage is formed. In the low region, a pixel voltage V(−) lower than an original voltage is formed due to the level shift voltage $\Delta V_P$, causing flicker or image-sticking.

That is, even if the white state voltage is applied, the accurate white voltage is not exhibited, resulting in failure. The reason for this is that $C_{LC}$ changes depending on the voltage and again influences the level shift voltage $\Delta V_P$.

In FIGS. 3A and 3B, $V_{com}$ represents the common voltage, $V_{G,ON}$ or $V_{G,OFF}$ represents a gate driving voltage, and $V_{LC}$ represents a pixel voltage applied to the liquid crystal layer.

Likewise, referring to FIG. 3B, when a select signal (a black state voltage) VD applied to the pixel changes from a high state to a low state, a pixel voltage V(+) lower than an original voltage is formed in the high region due to the level shift voltage $\Delta V_P$. In the low region, a pixel voltage V(−) lower than an original voltage is formed due to the level shift voltage $\Delta V_P$, causing flicker or image-sticking.

BRIEF SUMMARY

An LCD and a method of manufacturing the same that may substantially obviate one or more problems due to limitations and disadvantages of the related art is described herein.

The LCD may be capable of eliminating flicker and image-sticking, and may be able to apply accurately a pixel voltage in a white state or a black state by shifting a common voltage to correspond to a level shift voltage ($\Delta V_P$) generated at a pixel region.

According to one embodiment, the LCD may include: a first gate line and a second gate line disposed parallel to each other and perpendicular to a first data line and a second data line, thereby defining a unit pixel region; a first common line disposed parallel to the gate lines; a second common line extending from the first common line; a pixel bar and pixel electrodes disposed in the unit pixel region and electrically connected to a first switch; a second switch electrically connected to the second common line; and a common bar and common electrodes electrically connected to the second switch, the common electrodes being disposed alternately with the pixel electrodes.

In another aspect, there is provided an LCD which may include: a first gate line and a second gate line disposed parallel to each other and perpendicular to a first data line and a second data line, thereby defining a unit pixel region; a common line disposed parallel to the gate lines; a pixel bar and pixel electrodes disposed in the unit pixel region and electrically connected to a first switch; a second switch electrically connected to the second common line; a common bar and common electrodes electrically connected to the second switch, the common electrodes disposed alternately with the pixel electrodes.

In a further aspect, there is provided a method of manufacturing an LCD, which may include: depositing a metal layer on an insulating substrate and etching the deposited metal layer to form a gate line, a first common line, a second common line, a first gate electrode, and a second gate electrode; forming a first switch by forming a channel layer, an ohmic contact layer, a first source electrode and a first drain electrode on the first gate electrode, and forming a second switch by forming a channel layer, an ohmic contact layer, a second source electrode and a second drain electrode on the second gate electrode; forming a passivation layer on the insulating substrate where the first switch and the second switch are formed, and forming contact holes; and forming a pixel bar on the passivation layer where one of the contact holes is formed and forming a common bar on the passivation layer where another of the contact holes is formed.

In a further aspect, there is provided a method of manufacturing an LCD, which may include: depositing a metal layer on an insulating substrate and etching the deposited metal layer to form a gate line, a common line, a first gate electrode, and a second gate electrode; forming a first switch by forming a channel layer, an ohmic contact layer, a first source electrode, and a first drain electrode on the first gate electrode, and forming a second switch by forming a channel layer, an ohmic contact layer, a second source electrode and a drain electrode on the second gate electrode; forming a passivation layer on the insulating substrate where the first switch and the second switch are formed, and forming contact holes; and forming a pixel bar on the passivation layer where one of the contact holes is formed and a common bar on the passivation layer where another of the contact holes is formed.

In an further aspect, there is provided a method of manufacturing an LCD, which may include: depositing a metal layer on an insulating substrate and etching the deposited metal layer to form a gate line, a first common line, a second common line, a first gate electrode, and a second gate electrode; forming a first switch by forming a channel layer, an ohmic contact layer, a first source electrode, and a first drain electrode on the first gate electrode, and forming a second switch by forming a channel layer, an ohmic contact layer, and a second source electrode and a second drain electrode on the second gate electrode; forming a passivation layer on the insulating substrate where the first switch and the second switch are formed, and forming a contact hole; and forming a pixel bar on the passivation layer where the contact hole is formed.

In a further aspect, there is provided a method of manufacturing an LCD, which may include: depositing a metal layer on an insulating substrate and etching the deposited metal layer to form a gate line, a common line, a common electrode, a first gate electrode, and a second gate electrode; forming a first switch by forming a channel layer, an ohmic contact layer, a first source electrode, and a first drain electrode on the first gate electrode, and forming a second switch by forming a channel layer, an ohmic contact layer, a second source electrode, and a second drain electrode on the second gate electrode; forming a passivation layer on the insulating substrate where the first switch and the second switch are formed, and forming a contact hole; and forming a pixel bar on the passivation layer where the contact hole is formed.

In a further aspect, there is provided an LCD including: a first gate line and a first data line disposed parallel to each other and perpendicular to a first data line and a second data line, thereby defining a unit pixel region; a first common line disposed parallel to the data lines; a second common line extending from the first common line parallel to the gate lines; a pixel bar and pixel electrodes disposed in the unit pixel region and electrically connected to a first switch; a second switch electrically connected to the first common line; a common bar and common electrodes electrically connected to the second switch, the common electrodes disposed alternately with the pixel electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3A and 3B are graphs for explaining the problem of degrading image quality due to a level shift voltage generated at the pixel region;

DETAILED DESCRIPTION

Reference will now be made in detail to the preferred embodiments of the LCD device, examples of which are illustrated in the accompanying drawings. Wherever possible, the same reference numbers will be used throughout the drawings to refer to the same or like parts.

Figure 1:
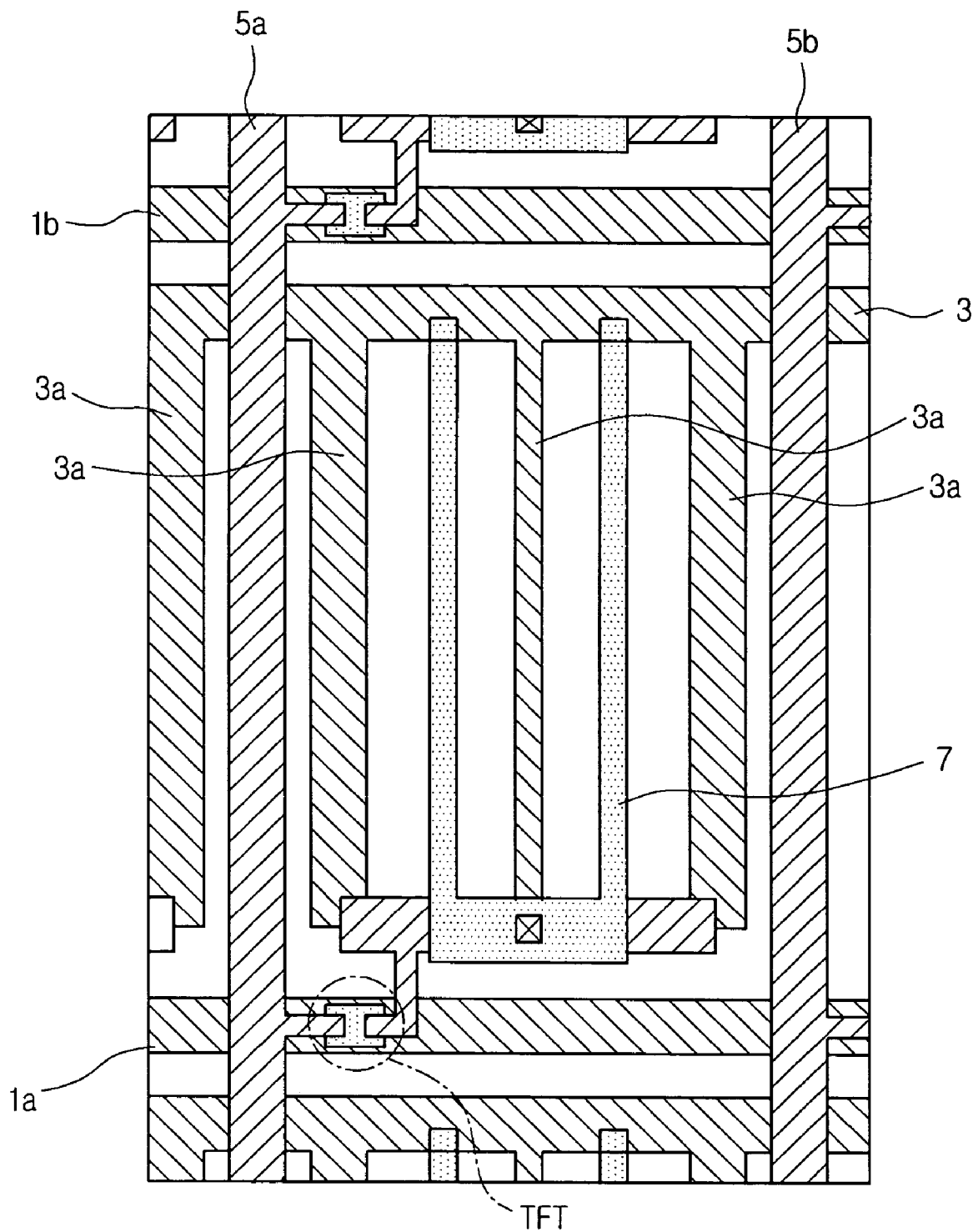
FIG. 1 is a plan view of a pixel region in a related art IPS LCD.
Figure 2:
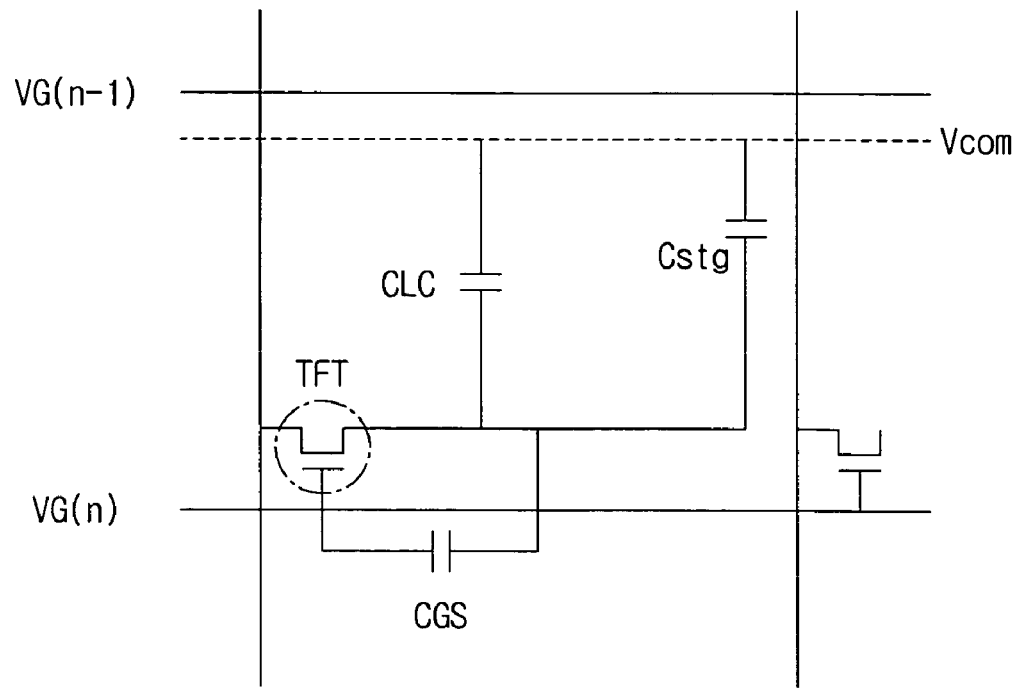
FIG. 2 is an equivalent circuit diagram of the pixel region illustrated in FIG. 1.
Figure 3A:
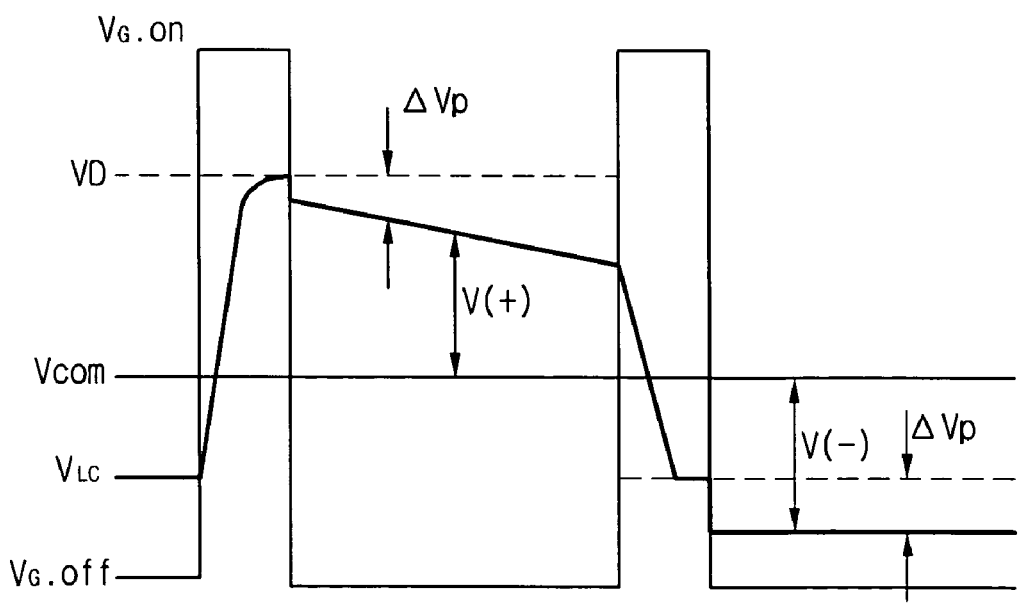
Figure 4A:
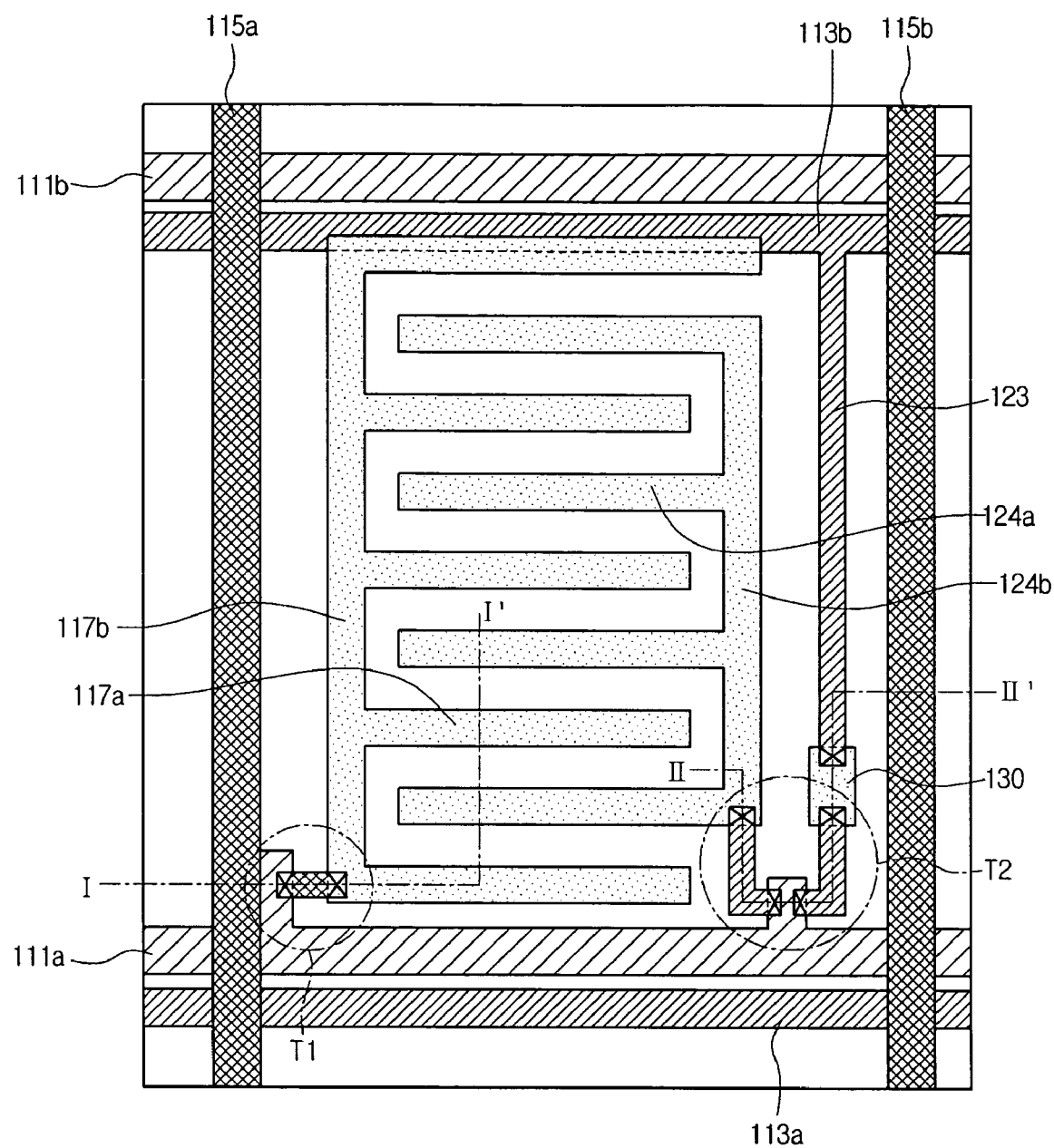
FIG. 4A is a plan view of a pixel region in an LCD according to one embodiment.

FIG. 4A is a plan view of a pixel structure of an IPS LCD according to one embodiment.

Referring to FIG. 4A, gate lines 111a and 111b for applying driving signals are positioned parallel to each other and perpendicular to data lines 115a and 115b for applying data signals. This configuration defines a unit pixel region. A first switch, such as, for example, a thin film transistor (TFT), acting as a switching element is positioned adjacent to the intersection of the gate line 111a and the data line 115a. This switch will be referred to as TFT T1. A second switch, which will be referred to as TFT T2, faces the first TFT T1 and is positioned adjacent to the intersection of the gate line 111a and the data line 115b.

Also, first common lines 113a and 113b are positioned parallel and adjacent to the gate lines 111a and 111b. A plurality of pixel electrodes 117a and a plurality of common electrodes 124a are alternately arranged in the unit pixel region. The pixel electrodes 117a extend from a pixel bar 117b and the common electrodes 124a extend from a common bar 124b.

The pixel bar 117b is parallel to the data line 115a, and the pixel bar 117b and the pixel electrodes 117a are electrically connected to the first TFT T1.

The common bar 124b is parallel to the data line 115b, and the common bar 124b and the common electrodes 124a are electrically connected to the second TFT T2.

Also, a second common line 123 extending from the first common line 113b is disposed between the common bar 124b and the data line 115b so as to apply a common voltage to the common bar 124b and the common electrode 124a.

A source electrode of the second TFT T2 may be electrically connected to a portion of the second common line 123 through a connection portion 130 formed of a transparent material. The transparent material may be, for example, indium tin oxide (ITO). Accordingly, when the second TFT T2 is turned on, the common voltage is applied to the common bar 124b and the common electrode 124a.

The first TFT T1 and the second TFT T2 may be equally designed. This is so that a level shift voltage ($\Delta V_P$) generated when the first TFT T1 is turned on/off may be equal to a level shift voltage ($\Delta V_{Com}$) generated when the second TFT T2 is turned on/off.

When the pixel voltage is reduced as much as the level shift voltage due to the first TFT T1, a corresponding common voltage may also be reduced as much as the level shift voltage ($\Delta V_{Com} = \Delta V_P$) such that a desired white or black voltage may be applied to the pixel region.

That is, when the first TFT T1 acting as the switching element is turned on, the second TFT T2 for applying the common voltage may also be turned on. At this point, the pixel voltage (data voltage) and the common voltage are applied to the pixel electrodes 117a and the common electrodes 124a, respectively.

On the contrary, when the first TFT T1 is turned off, the second TFT T2 may also be turned off to thereby prevent the pixel voltage from being distorted due to the level shift voltage, which will be described later in detail.

Figure 4B:
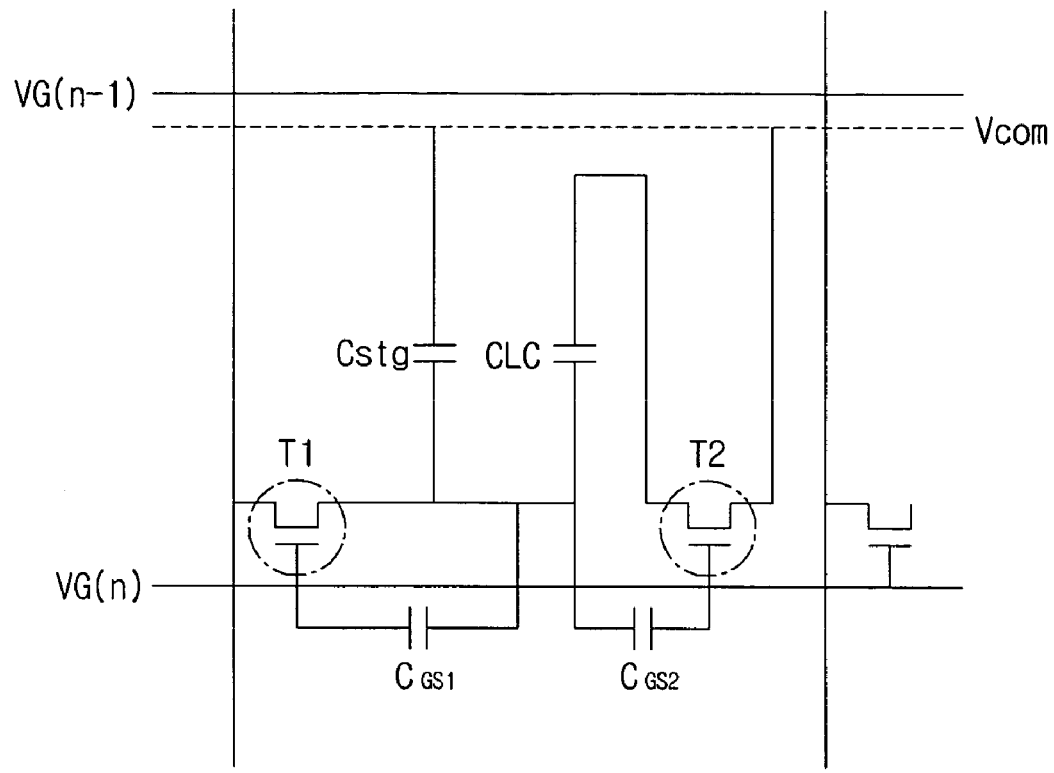
FIG. 4B is an equivalent circuit diagram of the pixel region illustrated in FIG. 4A.
Figure 5:
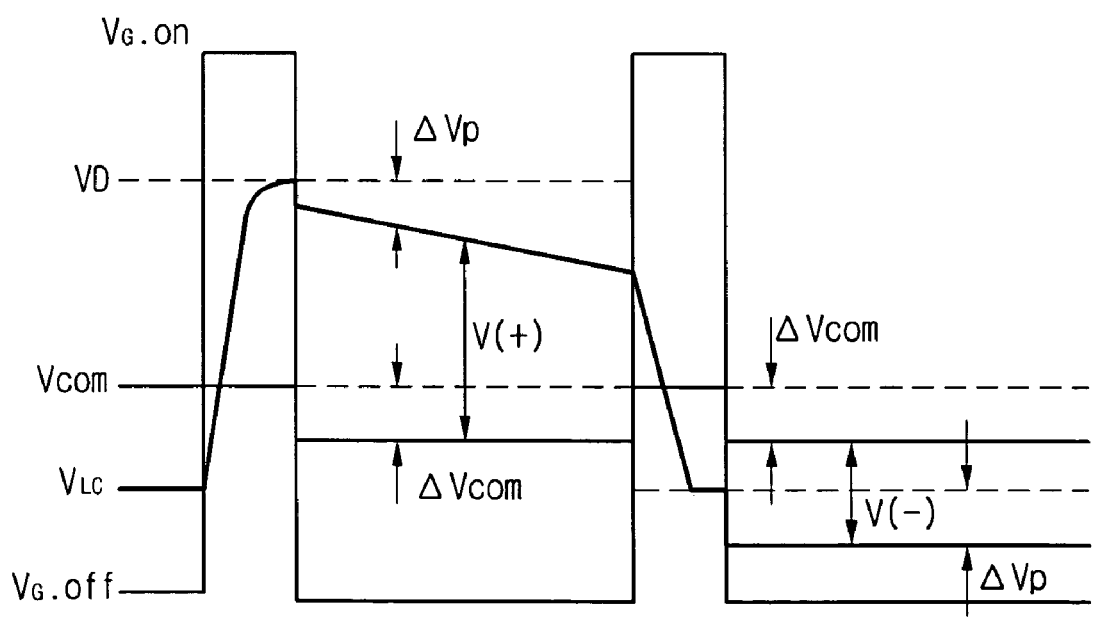
FIG. 5 is a graph for explaining the improvement in picture quality obtained by shifting a level of a common voltage corresponding to a level shift voltage in the pixel region in the LCD according to one embodiment.

FIG. 4B is an equivalent circuit diagram of the pixel region illustrated in FIG. 4A, and FIG. 5 is a graph for explaining the improvement in picture quality obtained by shifting a level of the common voltage corresponding to the level shift voltage in the pixel region of the LCD.

Referring to FIGS. 4B and 5, two switching elements T1 and T2 are arranged in the unit pixel region. The switching element T1 is connected in parallel to a storage capacitance $C_{stg}$ and a liquid crystal capacitance CLC.

Also, as described above in FIG. 4A, since the switching elements T1 and T2 may be equally designed, a parasitic capacitance $C_{GS1}$ of the switching element T1 may be equal to a parasitic capacitance $C_{GC2}$ of the switching element T2.

When the switching elements T1 and T2 are turned on/off ($V_G$, ON/OFF), a level shift voltage $\Delta V_P$ with respect to the pixel voltage may be equal to a level shift voltage $\Delta V_{Com}$ with respect to the common voltage. Therefore, the pixel voltage applied to the pixel region may not be reduced due to the level shift voltage $\Delta V_P$.

Accordingly, even if the level shift voltage is generated at the pixel region, desired pixel voltages V(+) and V(−) may be charged. Consequently, image quality and flicker may not be degraded. In FIG. 5, VD represents a data voltage applied through the data line.

FIGS. 6A to 6D are sectional views taken along lines I-I' and II-II' of FIG. 4A, showing a method of manufacturing the LCD according to one embodiment.

Figure 6A:
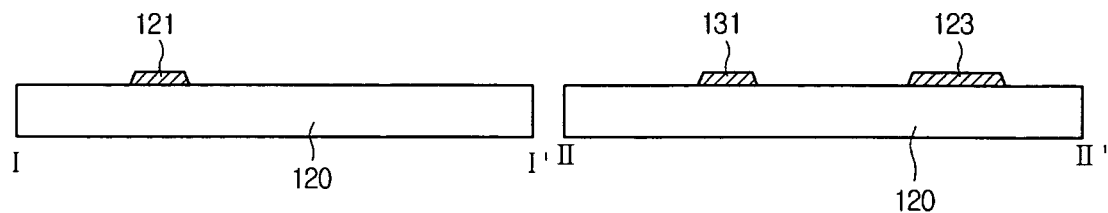
FIGS. 6A to 6D are sectional views taken along lines I-I' and II-II' of FIG. 4A, showing a method of manufacturing the LCD according to one embodiment.

Referring to FIG. 6A, a gate metal layer may be formed on a transparent insulating substrate 120, and a photoresist may be coated, exposed and developed to form a photoresist pattern through a photolithography.

Then, a first gate electrode 121 may be formed (a region I-I'), the gate metal layer corresponding to a first TFT T1 may be etched using the photoresist pattern as a mask, and a second gate electrode 131 corresponding to a second TFT T2 may be formed (a region II-II'). At this point, although not shown, gate lines (111a and 111b in FIG. 4A) and first common lines 113a and 113b may be integrally formed with the first gate electrode 121 and the second gate electrode 131. The first common lines 113a and 113b may be parallel to the gate lines.

That is, the gate electrodes 121 and 131, the gate lines, and the first common lines may all be formed on the insulating substrate 120. A second common line 123 may be integrally formed with the first common line (see FIG. 4A). The second common electrode 123 extends from the first common line to the pixel region and applies a common voltage to the pixel region.

Figure 6B:
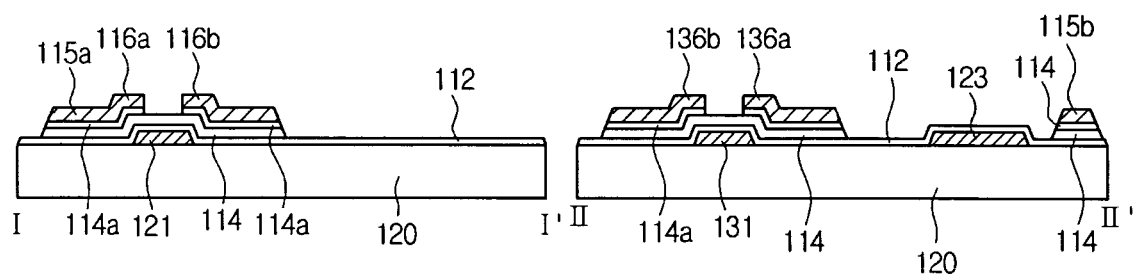

Referring to FIG. 6B, after the first and second gate electrodes 121 and 131 and the second common line 123 are formed, a gate insulating layer 112, an amorphous silicon layer, a doped amorphous silicon layer, and a metal layer may be sequentially formed on the insulating layer 120. Then, a channel layer 114, an ohmic contact layer 114a, a first source electrode 116a, and a first drain electrode 116b may be simultaneously formed on the first gate electrode 121 by a diffractive exposure or half-tone exposure, thereby providing a first TFT.

At this point, data lines 115a and 115b connected to the first source electrode 116a may be formed. Since the LCD may be manufactured by a 4-mask process, the channel layer and the ohmic contact layers 114 and 114a may be formed under the data lines 115a and 115b.

Likewise, in the region II-II', a gate insulating layer 112, a channel layer 114, an ohmic contact layer 114a, a second source electrode 136a, and a second drain electrode 136b may be simultaneously formed, thereby providing a second TFT.

As described above in FIG. 4A, the first TFT and the second TFT may be designed equally in terms of areas of channel layers and sizes of the electrodes. Therefore, when the TFTs are turned on/off, the level shift voltages may be identical to each other.

Figure 6C:
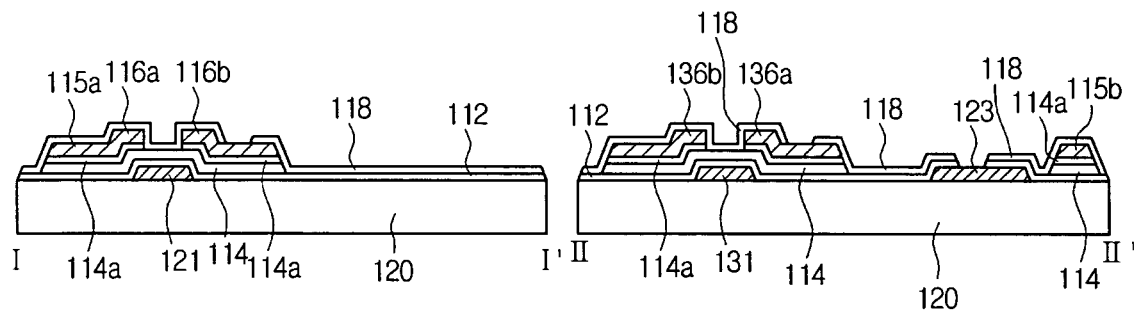

Referring to FIG. 6C, a passivation layer 118 may be formed on the insulating substrate 120 where the first and second TFTs have been formed. Then, a contact hole process may be performed to open the first drain electrode 116b, the second source electrode 136a, the second drain electrode 136b, and a gate pad (not shown) and a data pad (not shown).

Also, in the contact hole process, an edge region of the second common line 123 may be opened so as to electrically connect the second common line 123 and the second source electrode 136a of the second TFT.

Figure 6D:
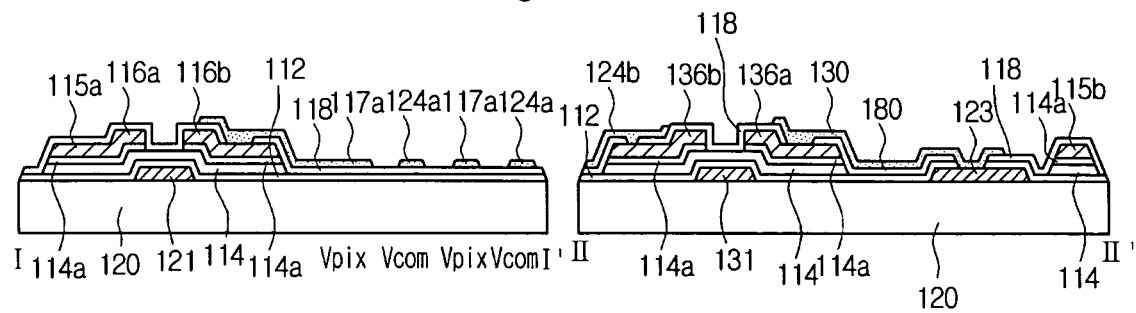

Referring to FIG. 6D, a transparent material layer may be formed on the insulating layer 120 and then may be etched to form pixel electrodes 117a, a pixel bar 117b, common electrodes 124a, and a common bar 124b. The pixel electrodes 117a and the pixel bar 117b are electrically connected to the first drain electrode 116b. The common electrodes 124a and the common bar 124b are electrically connected to the second drain electrode 136b.

At this point, a connection portion 130 may be formed to electrically connect the second common line 123 and the second source electrode 136a of the second TFT. Accordingly, the connection portion 130 may apply the common voltage through the second TFT to the common electrodes 124a.

In this manner, the first TFT may be formed to transfer the data voltage to the unit pixel region and the second TFT may be formed to transfer the common voltage, so that the pixel voltage generated at the unit pixel regions may not be distorted due to the level-shift voltage.

That is, the level shift voltage $\Delta V_{Com}$ with respect to the common voltage may correspond to the level shift voltage $\Delta V_P$ generated at the first TFT, so that the pixel voltage may not be changed due to the level shift voltage $\Delta V_P$.

Since the common voltage may be shifted as much as the level shift voltage $\Delta V_P$ corresponding to each of the pixel regions, an unbalance of the pixel voltage due to the conventional level shift voltage may be avoided.

Since the same effect may be obtained in all gray scale voltages, a gamma voltage may be easily designed and flicker and image-sticking may be eliminated because of the balance between voltages of positive/negative phases.

Figure 7A:
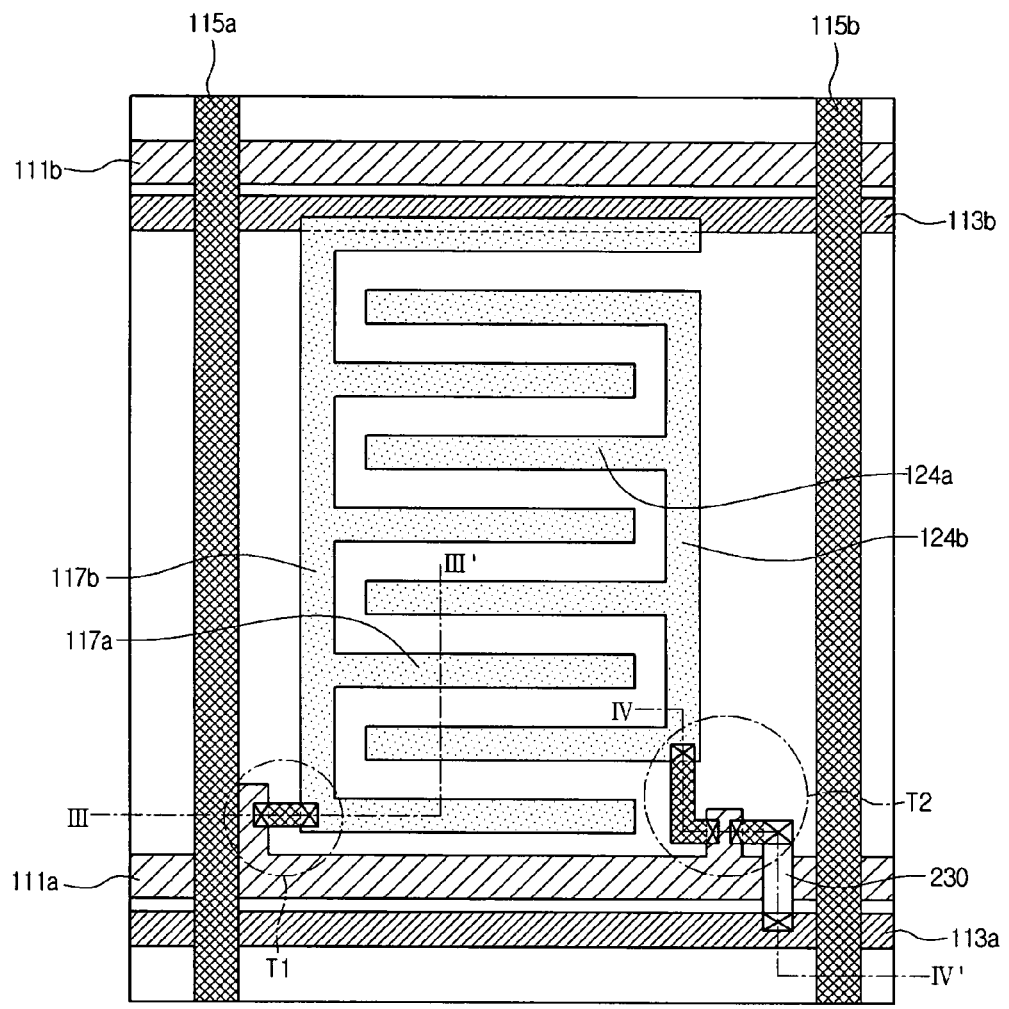
FIG. 7A is a plan view of a pixel region in an LCD according to another embodiment.

FIG. 7A is a plan view of a pixel region in an LCD according to another embodiment.

Referring to FIG. 7A, a first TFT T1 and a second TFT T2 acting as switching elements are arranged in a unit pixel region, as in FIG. 4A.

Structures in this figure differing from those of FIG. 4A will be described below in detail.

In the pixel structure of FIG. 7A, the second TFT T2 of the unit pixel region receives a common voltage from a common line 113a adjacent to a gate line 111a, and transfers the common voltage to common electrodes 124a and a common bar 124b.

Accordingly, the second common line extending from the common line 113b, as in FIG. 4A, is not formed. Due to a connection portion 230 formed of a transparent material, such as, for example, indium tin oxide (ITO), a source electrode of the second TFT T2 is connected to the common line 113a adjacent to the gate line connected to the second TFT, so that the common voltage may be supplied to the source electrode of the second TFT T2.

That is, the common voltage may be applied from the common line formed at a region adjacent to the unit pixel (specifically, a unit pixel region corresponding to a next gate line), and then an electric field may be generated.

The source electrode of the second TFT and its adjacent common line 113a may be electrically connected together through the connection portion 230 that vertically crosses the gate line 111a. The connection portion 230 may be formed in parallel to the data line 115b.

In this embodiment, the first TFT T1 and the second TFT T2 may be equally designed. This is so that a level shift voltage ($\Delta V_P$) generated when the first TFT T1 is turned on/off may be equal to a level shift voltage ($\Delta V_{Com}$) generated when the second TFT T2 is turned on/off.

When the pixel voltage is reduced by the level shift voltage due to the first TFT T1, the common voltage is correspondingly reduced as much as the level shift voltage ($\Delta V_{Com} = \Delta V_P$) such that a desired white or black voltage may be applied to the pixel region.

That is, when the first TFT T1 acting as the switching element is turned on, the second TFT T2 for applying the common voltage may also be turned on. At this point, the pixel voltage (data voltage) and the common voltage are applied to the pixel electrode 117a and the common electrode 124a, respectively.

On the contrary, when the first TFT T1 is turned off, the second TFT T2 may also be turned off to prevent the pixel voltage from being distorted due to the level shift voltage.

Figure 7B:
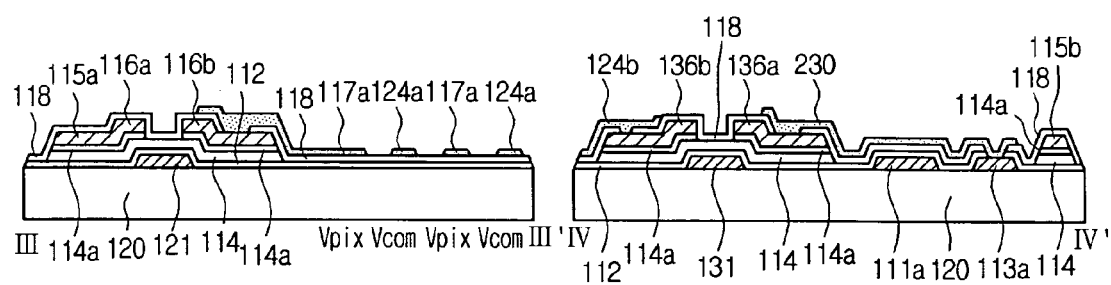
FIG. 7B is a sectional view taken along lines III-III' and IV-IV' of FIG. 7A.

FIG. 7B is a sectional view taken along lines III-III' and IV-IV' of FIG. 7A.

Through a manufacturing process identical to that of FIGS. 6A to 6D, the pixel electrodes 117a and the common electrodes 124a all may be formed of a transparent material, such as, for example, indium tin oxide (ITO). Since a section of the first TFT region taken along line III-III' of FIG. 7A may be identical to the region I-I' of FIG. 4A, a detailed description thereof will be omitted. The following description refers to a section of the second TFT taken along line IV-IV' of FIG. 7A.

In this embodiment, the manufacturing method is similar to that of FIGS. 6A to 6D, and therefore, differences will be primarily described below.

In a first mask process, when a gate line 111a, a common line 113a, a first gate electrode 121, and a second gate line 131 are formed, a second common line branched from the common line 113b in the unit pixel region may not be formed.

Accordingly, the second common line parallel to the data line 115b may not be formed in the unit pixel region.

The common voltage applied to the common electrodes 124a and the common bar 124b may be supplied from the first common line 113a adjacent to the gate line 111a.

In a third mask process of forming contact holes on a passivation layer 118, when the source electrode 136a and drain electrode 136b of the second TFT are opened, a portion of the common line 113a adjacent to the gate line 111a may be opened.

Then, in a fourth mask process of forming pixel electrodes 117a, a connection portion 230 may be formed to electrically connect the source electrode 136a of the second TFT and the common line 113a.

As shown in FIG. 7B, the connection portion 230 vertically crosses the gate line 111a and electrically connects the source electrode 136a of the second TFT and the common line 113a.

Accordingly, when the second TFT is turned on, the common voltage of the common line 113a may be applied to the common electrode 124a and the common bar 124b through the connection portion 230 and the second drain electrode 136b of the second TFT.

In this manner, the first TFT may be formed to transfer the data voltage to the unit pixel region and the second TFT may be formed to transfer the common voltage, so that the pixel voltage generated at the unit pixel regions may not be distorted due to the level shift voltage.

That is, the level shift voltage $\Delta V_{Com}$ with respect to the common voltage may correspond to the level shift voltage $\Delta V_P$ generated at the first TFT, so that the pixel voltage may not be substantially changed due to the level shift voltage $\Delta V_P$.

Since the common voltage may be shifted as much as the level shift voltage $\Delta V_P$ corresponding to each of the pixel regions, an unbalance of the pixel voltage due to the conventional level shift voltage may be avoided.

Since the same effect may be obtained in all gray scale voltages, a gamma voltage may be easily designed and flicker and image-sticking may be eliminated because of the balance between voltages of positive/negative phases.

Figure 8A:
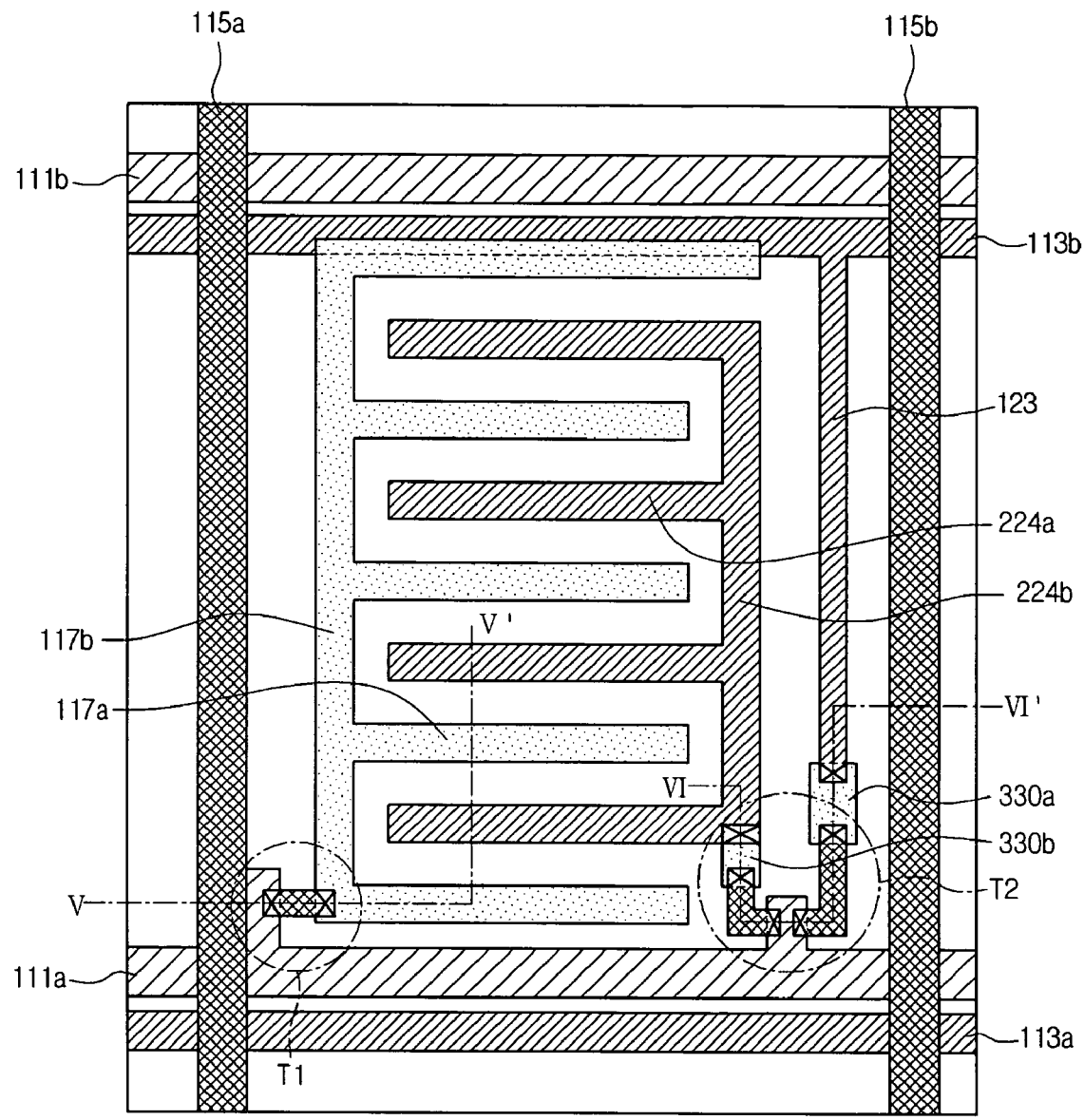
FIG. 8A is a plan view of a pixel region in an LCD according to another embodiment.

FIG. 8A is a plan view of a pixel region in an LCD according to a further embodiment.

Like the pixel structure of FIG. 4A, a first TFT T1 and a second TFT T2 are arranged in a unit pixel region.

The following description will focus on structures in FIG. 8A that differ from those in FIG. 4A.

Unlike the pixel structure of FIG. 4A, common electrodes 224a and a common bar 224b may be formed of a gate metal, such as, for example, aluminum, chromium, tantalum, tungsten, or alloys thereof.

That is, in the unit pixel region, common electrodes 224a and the common bar 224b electrically connected to a second common line 123 extending from a first common line 113b and a drain electrode of the second TFT T2 may be formed of a gate metal.

Also, a source electrode of the second TFT and the second common line 123 may be connected together through a first connection portion 330a. The drain electrode of the second TFT, the common electrodes 224a, and the common bar 224b may be connected together through a second connection portion 330b.

Accordingly, the common voltage applied through the second common line 123 may be transferred through the first connection portion 330a to the drain electrode of the second TFT, and the common voltage applied to the drain electrode may be transferred through the second connection portion 330b to the common electrodes 224a and the common bar 224b.

In this embodiment, the first TFT T1 and the second TFT T2 may be equally designed. This is so that a level shift voltage ($\Delta V_P$) generated when the first TFT T1 is turned on/off may equal a level shift voltage ($\Delta V_{Com}$) generated when the second TFT T2 is turned on/off.

When the pixel voltage is reduced as much as the level shift voltage due to the first TFT T1, the common voltage is correspondingly reduced as much as the level shift voltage ($\Delta V_{Com} = \Delta V_P$) such that a desired white or black voltage may be applied to the pixel region.

That is, when the first TFT T1 acting as the switching element is turned on, the second TFT T2 for applying the common voltage may also be turned on. At this point, the pixel voltage (data voltage) and the common voltage are applied to the pixel electrode 117a and the common electrode 224a, respectively.

On the contrary, when the first TFT T1 is turned off, the second TFT T2 may also be turned off to prevent the pixel voltage from being distorted due to the level shift voltage, which will be described later in detail.

Figure 8B:
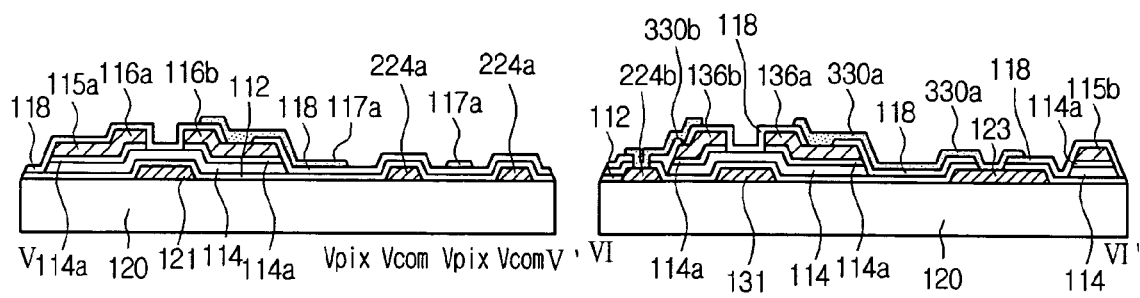
FIG. 8B is a sectional view taken along lines V-V' and VI-VI' of FIG. 8A.

FIG. 8B is a sectional view taken along lines V-V' and VI-VI' of FIG. 8A.

The manufacturing method of FIG. 8B may be identical to that of FIGS. 6A to 6D, except that a pixel electrode 117a may be formed of a transparent material, such as, for example, indium tin oxide (ITO), and a common electrode 224a may be formed of an opaque metal that is a gate metal, such as, for example, aluminum, chromium, tantalum, tungsten, or alloys thereof.

In this embodiment, the manufacturing method is similar to that of FIGS. 6A to 6D, and therefore, differences will be primarily described below.

In a region V-V', a section of the first TFT may be identical to the region I-I' of FIG. 6D. However, common electrodes 224a formed of a gate metal in a layer of a first gate electrode 121 are arranged between pixel electrodes 117a connected to the drain electrode 116b of the first TFT.

That is, the common electrodes 224a may be formed on the insulating substrate 120 and the pixel electrodes 117a may be formed on the passivation layer 118.

In a region VI-VI', a section of the second TFT may be identical to the region II-II' of FIG. 6D. Also, the source electrode 136a of the second TFT and the second common line 123 may be connected together through a first connection portion 330a.

However, the common electrodes 224a and the common bar 224b may be formed on the insulating substrate 120 where the first gate electrode 121 and the second gate electrode 131 are formed. Therefore, during the contact hole process, the common bar 224b adjacent to the second TFT and the drain electrode 136b of the second TFT may be opened.

During the process of forming the pixel electrode 117a, a second connection portion 330b may be formed to electrically connect the common bar 224b and the drain electrode 136b of the second TFT.

Accordingly, the common voltage may be transferred to the common electrodes 224a and the common bar 224b through the first connection portion 330a and the second connection portion 330b.

In this manner, the first TFT may be formed to transfer the data voltage to the unit pixel region and the second TFT may be formed to transfer the common voltage, so that the pixel voltage generated at the unit pixel regions may not be distorted due to the level shift voltage.

That is, the level shift voltage $\Delta V_{Com}$ with respect to the common voltage may correspond to the level shift voltage $\Delta V_P$ generated at the first TFT, so that the pixel voltage may not change due to the level shift voltage $\Delta V_P$.

Since the common voltage may be shifted as much as the level shift voltage $\Delta V_P$ corresponding to each of the pixel regions, an unbalance of the pixel voltage due to the conventional level shift voltage may be avoided.

Since the same effect may be obtained in all gray scale voltages, a gamma voltage may be easily designed and flicker and image-sticking may be eliminated because of the balance between voltages of positive/negative phases.

Figure 9A:
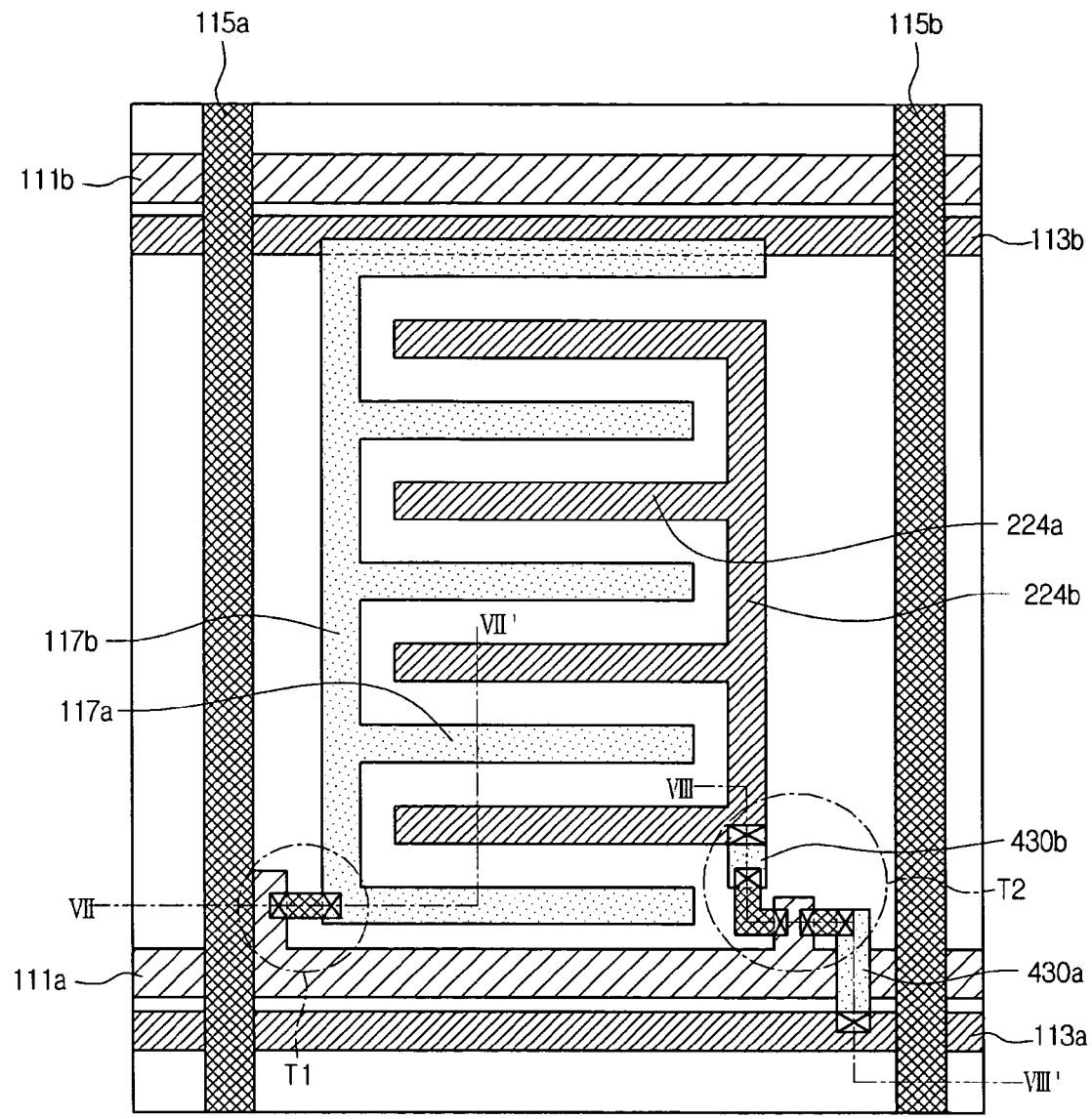
FIG. 9A is a plan view of a pixel region in an LCD according to another embodiment.

FIG. 9A is a plan view of a pixel region in an LCD according to a further embodiment.

Like the pixel structure of FIG. 8A, a common electrode 224a and a common bar 224b may be formed of a gate metal, such as, for example, aluminum, chromium, tantalum, tungsten, or alloys thereof, and a pixel electrode 117a and a pixel bar 117b may be formed of a transparent material, such as, for example, indium tin oxide (ITO).

However, unlike the pixel structure of FIG. 8A, a second TFT may be electrically connected to a first connection portion 430a such that it receives a common voltage from a common line 113a adjacent to a gate line 111a.

The first connection portion 430a has one end electrically connected to a source electrode of the second TFT, and the other end electrically connected to the common line 113a while vertically crossing the gate line 111a (see FIG. 7A). Accordingly, the common voltage applied from the common line 113a may be transferred to the second TFT through the first connection portion 430a.

Like this, the common voltage applied to the second TFT is transferred to the common electrodes 224a through the second connection bar 430b, which has one end connected to the drain electrode and the other end connected to the common bar 224b.

In this embodiment, the first TFT T1 and the second TFT T2 may be equivalently designed. This is so that a level shift voltage ($\Delta V_P$) generated when the first TFT T1 is turned on/off may be equal to a level shift voltage ($\Delta V_{Com}$) generated when the second TFT T2 is turned on/off.

When the pixel voltage is reduced as much as the level shift voltage due to the first TFT T1, the common voltage may be correspondingly reduced as much as the level shift voltage ($\Delta V_{Com}=\Delta V_P$) such that a desired white or black voltage may be applied to the pixel region.

That is, when the first TFT T1 acting as the switching element is turned on, the second TFT T2 for applying the common voltage may also be turned on. At this point, the pixel voltage (data voltage) and the common voltage are applied to the pixel electrode 117a and the common electrode 224a, respectively.

On the contrary, when the first TFT T1 is turned off, the second TFT T2 may also be turned off to prevent the pixel voltage from being distorted due to the level shift voltage.

Figure 9B:
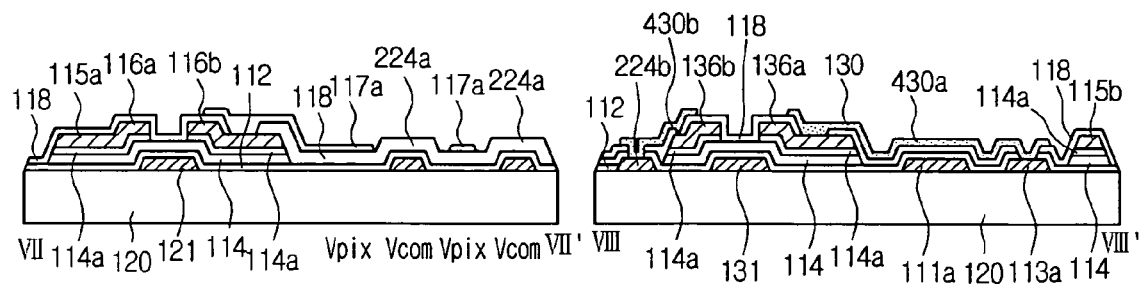
FIG. 9B is a sectional view taken along lines VII-VII' and VIII-VIII' of FIG. 9A.

FIG. 9B is a sectional view taken along lines VII-VII' and VIII-VIII' of FIG. 9A.

Since a section VII-VII' of FIG. 9B is identical to the section V-V' of FIG. 8B, a detailed description thereof is omitted. The following description centers on the region VIII-VIII'.

In the region VIII-VIII', the connection of the second TFT and the common bar 224b and the structure of the second TFT are identical to the section VI-VI' of FIG. 8B. Thus, only a connection structure of a first connection portion 430a is described below.

Since the LCD is manufactured through the 4-mask process described in FIGS. 6A and 6B, the respective manufacturing steps are omitted.

The second connection portion 430a electrically connects the source electrode 136a of the second TFT and the common line 113a adjacent to the gate line 111a.

The second connection portion 430a may be formed of a transparent material, such as, for example, indium tin oxide (ITO), during the process of forming the pixel electrode 117a, and vertically crosses the gate line 111a.

In this manner, the first TFT may be formed to transfer the data voltage to the unit pixel region and the second TFT may be formed to transfer the common voltage, so that the pixel voltage generated at the unit pixel regions may not be distorted due to the level shift voltage.

That is, the level shift voltage $\Delta V_{Com}$ with respect to the common voltage may correspond to the level shift voltage $\Delta V_P$ inevitably generated at the first TFT, so that the pixel voltage may not change due to the level shift voltage $\Delta V_P$.

Figure 10:
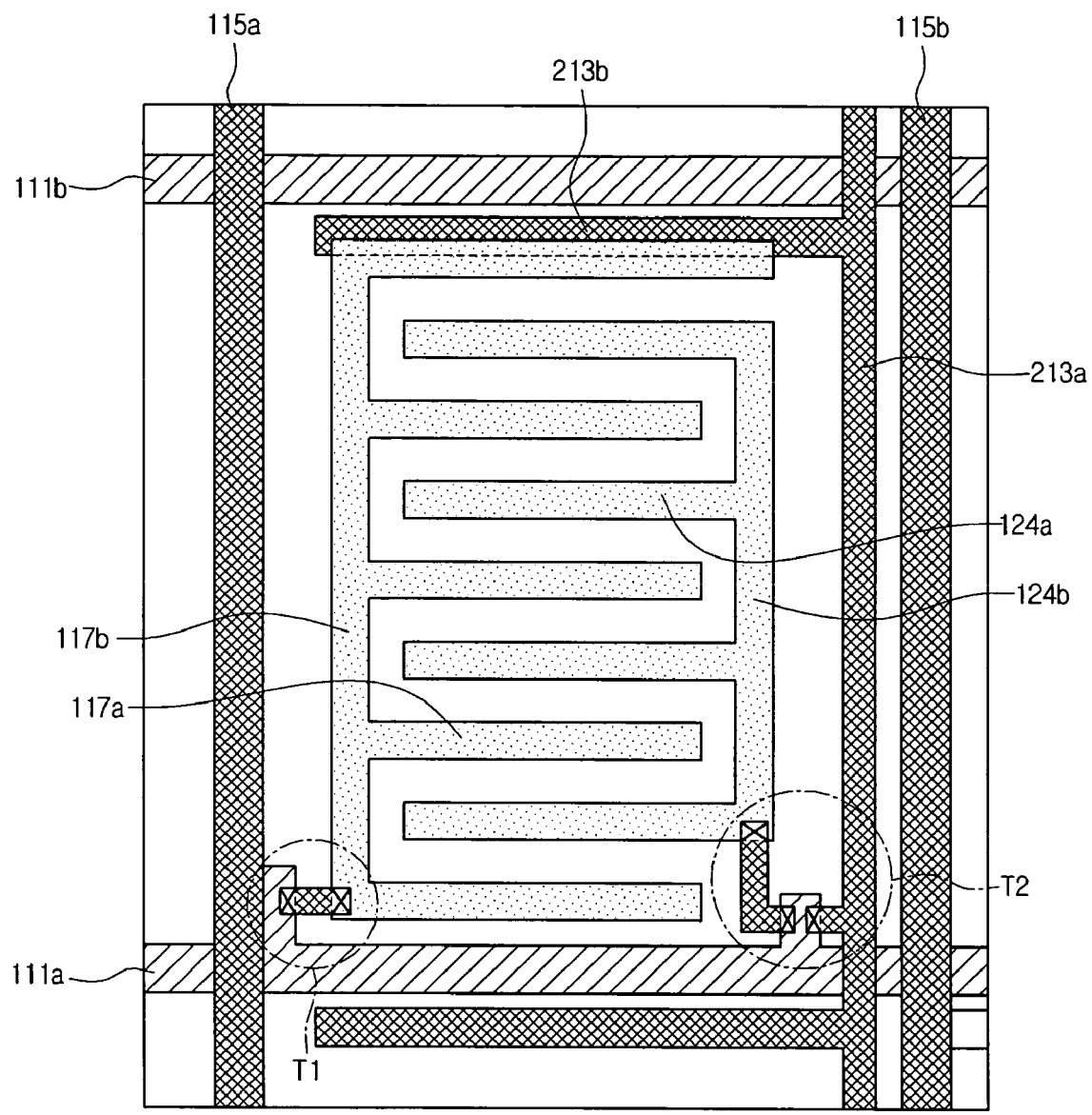
FIG. 10 is a plan view of a pixel region in an LCD according to another embodiment.

FIG. 10 is a plan view of a pixel region in an LCD according to a further embodiment.

Like the pixel structure of FIG. 4A, a first TFT T1 and a second TFT2 are arranged in a unit pixel region.

Different structures from those of FIG. 4A are described below in detail.

Referring to FIG. 10, a first common line 213a and a second common line 213b are formed on the same layer as data lines 115a and 115b, and the first common line 213a is parallel to the data lines 115a and 115b.

The second common line 213b extending from the first common line 213a is parallel to the gate lines 111a and 111b. Also, a portion of the second common line 213b may be overlapped with the pixel electrode 117a to thereby form an auxiliary static capacitance.

A drain electrode and source electrode of the second TFT T2 may be integrally formed with the first common line 213a. Therefore, an additional connection portion may not be needed.

A drain electrode of the first TFT is electrically connected to the pixel electrodes 117a, and a drain electrode of the second TFT T2 is directly connected to the common bar 124b and the common electrodes 124a.

In this embodiment, the first TFT T1 and the second TFT T2 may be equivalently designed. This is so that a level shift voltage ($\Delta V_P$) generated when the first TFT T1 is turned on/off may equal a level shift voltage ($\Delta V_{Com}$) generated when the second TFT T2 is turned on/off.

When the pixel voltage is reduced as much as the level shift voltage due to the first TFT T1, the common voltage is correspondingly reduced ($\Delta V_{Com}=\Delta V_P$) such that a desired white or black voltage may be applied to the pixel region.

That is, when the first TFT T1 acting as the switching element is turned on, the second TFT T2 for applying the common voltage may also be turned on. At this point, the pixel voltage (data voltage) and the common voltage are applied to the pixel electrode 117a and the common electrode 124a, respectively.

On the contrary, when the first TFT T1 is turned off, the second TFT T2 may also be turned off to prevent the pixel voltage from being distorted due to the level shift voltage.

Since the common voltage may be shifted as much as the level shift voltage $\Delta V_P$ corresponding to each of the pixel regions, an unbalance of the pixel voltage due to the conventional level shift voltage may be avoided.

Since the same effect may be obtained in all gray scale voltages, a gamma voltage may be easily designed and flicker and image-sticking may be eliminated because of the balance between voltages of positive/negative phases.

As described above, by shifting the common voltage to correspond to the level shift voltage $\Delta V_P$ generated at the pixel region of the LCD, the pixel voltage may be accurately applied in a white state or a black state, thereby eliminating flicker and image-sticking.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD (liquid crystal display device) comprising:
    a first gate line and a second gate line disposed parallel to each other and perpendicular to a first data line and a second data line, thereby defining a unit pixel region;
    a first common line disposed parallel to the gate lines;
    a second common line extending from the first common line;
    a pixel bar and pixel electrodes disposed in the unit pixel region and electrically connected to a first switch;
    a second switch electrically connected to the second common line;
    a common bar and common electrodes electrically connected to the second switch, the common electrodes being disposed alternately with the pixel electrodes.

2. The LCD according to claim 1, wherein the first common line is disposed in the unit pixel region.

3. The LCD according to claim 1, wherein the first switch is disposed adjacent to an intersection of the first gate line and the first data line.

4. The LCD according to claim 1, wherein the second switch is disposed adjacent to an interection of the first gate line and the second data line.

5. The LCD according to claim 1, wherein the second common line and the second switch are connected by a connection portion.

6. The LCD according to claim 5, wherein the connection portion is formed of a transparent material.

7. The LCD according to claim 1, wherein the pixel electrodes and the pixel bar are formed of a transparent material.

8. The LCD according to claim 1, wherein the common electrodes and the common bar are formed of a transparent material.

9. The LCD according to claim 1, wherein the first switch applies a data signal from the data line to the pixel electrodes.

10. The LCD according to claim 1, wherein the second switch applies a common voltage from the first common line to the common electrodes.

11. The LCD according to claim 1, wherein the common electrodes and the common bar are formed of a gate metal.

12. The LCD according to claim 11, wherein the second switch is connected to the second common line through a first connection portion and to the common bar through a second connection portion.

13. The LCD according to claim 12, wherein the first connection portion and the second connection portion are formed of a transparent material.

14. An LCD (liquid crystal display device) comprising:
    a first gate line and a second gate line disposed parallel to each other and perpendicular to a first data line and a second data line, thereby defining a unit pixel region;
    a common line disposed parallel to the gate lines;
    a pixel bar and pixel electrodes disposed in the unit pixel region and electrically connected to a first switch;
    a second switch electrically connected to the second common line;
    a common bar and common electrodes electrically connected to the second switch, the common electrodes disposed alternately with the pixel electrodes.

15. The LCD according to claim 14, wherein the common line is disposed outside the unit pixel region adjacent to the first gate line.

16. The LCD according to claim 14, wherein the first switch is disposed adjacent to an intersection of the first gate line and the first data line.

17. The LCD according to claim 14, wherein the second switch is disposed adjacent to an intersection of the first gate line and the second data line.

18. The LCD according to claim 14, further comprising a connection portion for electrically connecting the second switch and the common line.

19. The LCD according to claim 18, wherein the connection portion is formed of a transparent material.

20. The LCD according to claim 14, wherein the pixel electrodes and the pixel bar are formed of a transparent material.

21. The LCD according to claim 14, wherein the common electrodes and the common bar are formed of a transparent material.

22. The LCD according to claim 14, wherein the first switch applies a data signal from the data line to the pixel electrodes.

23. The LCD according to claim 14, wherein the second switch applies a common voltage from the common line to the common electrodes.

24. The LCD according to claim 14, wherein the common electrodes and the common bar are formed of a gate metal.

25. The LCD according to claim 24, wherein the second switch is connected to the common line adjacent to the gate line through a first connection portion and to the common bar through a second connection portion.

26. The LCD according to claim 25, wherein the first connection portion and the second connection portion are formed of a transparent material.

27. A method of manufacturing an LCD (liquid crystal display device), comprising:
    depositing a metal layer on an insulating substrate and etching the deposited metal layer to form a gate line, a first common line, a second common line, a first gate electrode, and a second gate electrode;
    forming a first switch by forming a channel layer, an ohmic contact layer, a first source electrode and a first drain electrode on the first gate electrode, and forming a second switch by forming a channel layer, an ohmic contact layer, a second source electrode and a second drain electrode on the second gate electrode;
    forming a passivation layer on the insulating substrate where the first switch and the second switch are formed, and forming contact holes; and forming a pixel bar on the passivation layer where one of the contact holes is formed and forming a common bar on the passivation layer where another of the contact holes is formed.

28. The method according to claim 27, wherein the forming of the pixel bar includes forming a connection portion for electrically connecting the second switch and the second common line.

29. The method according to claim 28, wherein, in the forming of the contact holes, the second drain electrode, the second source electrode, and a portion of the second common line are opened.

30. The method according to claim 28, wherein the first common line and the second common line are integrally formed.

31. The method according to claim 28, wherein pixel electrodes and common electrodes are formed alternately spaced apart from each other in a unit pixel region.

32. A method of manufacturing an LCD (liquid crystal display device), comprising:
depositing a metal layer on an insulating substrate and etching the deposited metal layer to form a gate line, a common line, a first gate electrode, and a second gate electrode;
forming a first switch by forming a channel layer, an ohmic contact layer, a first source electrode, and a first drain electrode on the first gate electrode, and forming a second switch by forming a channel layer, an ohmic contact layer, a second source electrode and a drain electrode on the second gate electrode;
forming a passivation layer on the insulating substrate where the first switch and the second switch are formed, and forming contact holes; and
forming a pixel bar on the passivation layer where one of the contact holes is formed and a common bar on the passivation layer where another of the contact holes is formed.

33. The method according to claim 32, wherein the forming of the pixel bar includes forming a first connection portion for electrically connecting the second switch and the common line, and a second connection portion for electrically connecting the second switch and the common bar.

34. The method according to claim 32, wherein, in the forming of the contact holes, the second drain electrode, the second source electrode, and a portion of the common line, the common line being adjacent to the gate line, are opened.

35. The method according to claim 32, wherein pixel electrodes and the common electrodes are formed alternately spaced apart from each other in a unit pixel region.

36. A method of manufacturing an LCD (liquid crystal display device), comprising:
depositing a metal layer on an insulating substrate and etching the deposited metal layer to form a gate line, a first common line, a second common line, a first gate electrode, and a second gate electrode;
forming a first switch by forming a channel layer, an ohmic contact layer, a first source electrode, and a first drain electrode on the first gate electrode, and forming a second switch by forming a channel layer, an ohmic contact layer, and a second source electrode and a second drain electrode on the second gate electrode;
forming a passivation layer on the insulating substrate where the first switch and the second switch are formed, and forming a contact hole; and
forming a pixel bar on the passivation layer where the contact hole is formed.

37. The method according to claim 36, wherein the forming of the pixel bar includes forming a connection portion for electrically connecting the second switch and the second common line.

38. The method according to claim 36, wherein, in the forming of the contact holes, the second drain electrode, second source electrode, and a portion of the second common line are opened.

39. The method according to claim 36, wherein the first common line and the second common line are integrally formed.

40. A method of manufacturing an LCD (liquid crystal display device), comprising:
depositing a metal layer on an insulating substrate and etching the deposited metal layer to form a gate line, a common line, a common electrode, a first gate electrode, and a second gate electrode;
forming a first switch by forming a channel layer, an ohmic contact layer, a first source electrode, and a first drain electrode on the first gate electrode, and forming a second switch by forming a channel layer, an ohmic contact layer, a second source electrode, and a second drain electrode on the second gate electrode;
forming a passivation layer on the insulating substrate where the first switch and the second switch are formed, and forming a contact hole; and
forming a pixel bar on the passivation layer where the contact hole is formed.

41. The method according to claim 40, wherein the forming of the pixel electrode includes forming a first connection portion for electrically connecting the second switch and the common line, the common line being adjacent to the gate line, and a second connection portion for electrically connecting the second switch and the common electrode.

42. The method according to claim 40, wherein, in the forming of the contact hole, the second drain electrode, the second source electrode, and a portion of the common line, the common line being adjacent to the gate line, are opened.

43. The method according to claim 40, wherein pixel electrodes and common electrodes are formed alternately spaced apart from each other in a unit pixel region.

44. An LCD (liquid crystal display device) comprising:
a first gate line and a first data line disposed parallel to each other and perpendicular to a first data line and a second data line, thereby defining a unit pixel region;
a first common line disposed parallel to the data lines;
a second common line extending from the first common line parallel to the gate lines;
a pixel bar and pixel electrodes disposed in the unit pixel region and electrically connected to a first switch;
a second switch electrically connected to the first common line;
a common bar and common electrodes electrically connected to the second switch, the common electrodes disposed alternately with the pixel electrode.

45. The LCD according to claim 44, wherein the first switch is disposed adjacent to an intersection of the first gate line and the first data line.

46. The LCD according to claim 44, wherein the second switch is disposed adjacent to an intersection of the first gate line and the second data line.

47. The LCD according to claim 44, wherein the pixel electrodes and the pixel bar are formed of a transparent material.

48. The LCD according to claim 44, wherein the common electrodes and the common bar are formed of a transparent material.

49. The LCD according to claim 44, wherein the first switch is a switching element for applying a data signal from the data line to the pixel electrodes.

50. The LCD according to claim 44, wherein the second switch is a switching element for applying a common voltage from the first common line to the common electrodes.

51. The LCD according to claim 44, wherein the first common line and the second common line are formed of a metal used for the data line.

52. The LCD according to claim 44, wherein the second common line and the pixel line overlap with each other to thereby form an auxiliary static capacitance.

* * * * *

UNITED STATES PATENT AND TRADEMARK OFFICE
CERTIFICATE OF CORRECTION

PATENT NO.        : 7,545,356 B2
APPLICATION NO.   : 11/320048
DATED             : June 9, 2009
INVENTOR(S)       : Soh HoeSup Page 1 of 1

It is certified that error appears in the above-identified patent and that said Letters Patent is hereby corrected as shown below:

In column 13, claim 4, line 44, after "adjacent to an" replace "interection" with --intersection--.

Signed and Sealed this

Twentieth Day of October, 2009

David J. Kappos
*Director of the United States Patent and Trademark Office*